United States Patent [19]

Hartigan, Jr.

[11] Patent Number: 4,482,601
[45] Date of Patent: Nov. 13, 1984

[54] WET PRESS PAPERMAKERS FELT AND METHOD OF FABRICATION

[75] Inventor: Richard J. Hartigan, Jr., Delmar, N.Y.

[73] Assignee: Albany International Corp., Albany, N.Y.

[21] Appl. No.: 499,350

[22] Filed: May 31, 1983

[51] Int. Cl.³ .......................... B32B 5/02; D06H 7/22
[52] U.S. Cl. ..................................... 428/234; 28/107; 28/168; 428/240; 428/283; 428/286; 428/300
[58] Field of Search .............. 428/234, 240, 283, 286, 428/300; 28/107, 168

[56] References Cited

U.S. PATENT DOCUMENTS

| | | | |
|---|---|---|---|
| 4,119,753 | 10/1978 | Smart | 428/234 |
| 4,361,618 | 11/1982 | Dufour | 428/234 |
| 4,382,987 | 5/1983 | Smart | 428/234 |

Primary Examiner—Marion E. McCamish
Attorney, Agent, or Firm—Kane, Dalsimer, Kane, Sullivan and Kurucz

[57] ABSTRACT

The disclosure is of a method of preparing a papermakers wet press felt fabric, felts made therefrom and their use, as wet press felts on papermaking machines. By the method of the invention, there is obtained a method of making a papermaker's press felt harder and denser while at the same time maintaining a high level of void volume and permeability in a loaded nip of a paper machine press.

2 Claims, 6 Drawing Figures

WET PRESS PAPERMAKERS FELT AND METHOD OF FABRICATION

BACKGROUND OF THE INVENTION

1. Field of the Invention

The invention relates to papermakers felts and more particularly relates to a wet press felt for use in the press section of a papermaking machine and the method of its fabrication.

2. Brief Description of the Prior Art

The conventional papermaking machine can be described as a highly sophisticated means of removing water from a dispersion of paper furnish. The machine includes three distinctly separate sections, beginning with the forming section where the furnish is deposited on a travelling forming wire and initially dewatered. The web of paper formed is conveyed into the wet press section for dewatering and then into the dryer section for final drying or removal of residual water by evaporation.

An important part of the process of papermaking is the efficiency of dewatering in the wet press section. The higher the efficiency of water removal in this section, the less will be the energy requirement in the dryer section.

In the wet press section of the papermaking machine, the formed web of paper is carried by one or more endless press felts through one or more presses which force the water out of the paper web and into or through the press felt. In the past, the press felts employed to carry the paper web through the press or presses have been absorbent woven and needled fabrics which are relatively resilient and compressible throughout their thickness. A wide variety of natural and synthetic fibers, yarns, woven and non-woven fabrics have been put together in a wide variety of combinations to fabricate wet-press felts. The objective is to arrive at a combination of felt components which will receive a maximum volume of water from the paper web as web and felt are compressed together in the nip of the press or presses, retain this water as the web and felt pass from the press nip (to minimize rewetting of the paper web) and then release the water before entering the press again. All of this must be accomplished by the felt fabric within the further requirements of structural integrity, runability, proper weight, resistance to filling with paper debris, resistance to compaction and like properties. As those skilled in the art fully appreciate, most of the fabrics employed to make wet-press felts are compromises, adequate in one or more of the requirements but excelling in one or more of other desired physical properties.

Current theory maintains that if the wet-press fabric were more dense, harder and more resistant to compression, there would be an enhancement of water removal. However, if the fabric had greater density and resistance to compaction than now provided in wet-press felts, it would seem that the fabric would have to have a lower void volume and less air permeability. Thus, another compromise would be necessary in order to take this approach to enhancing water removal.

Prior art attempts to obtain greater density in wet press felt fabrics have included installing them on papermaking machines and compacting them during a break-in period. The phenomenon of "break-in" of a papermaker's felt on a paper machine has been recognized for a long time. The so-called "break-in" period is usually defined as that time just after a new press felt has been installed on the paper machine (when its performance is less than optimum). The "break-in" period can last from several hours to a week and is usually accompanied by one or more of the following: (1) lower solid content in the paper after the nip, (2) harder drying, (3) operating problems such as blowing, picking and drop-offs, and (4) inability to run at top speed.

Although beneficial, felt compaction during "break-in" periods on the paper machine is expensive, troublesome and undesirable to the papermakers. Break-in time on the paper machine slows production and causes numerous quality and sheet handling problems. A new felt is more susceptible to filling and subsequent premature blinding during its initial faster rate of compaction, i.e., the break-in period. This is due to the fact that the large pores in a bulky new felt more readily occlude with paper stock, fines, fillers, etc., while they are being made smaller during compaction.

Precompaction has also always been a part of felt making, ever since all wool felts were run in a "kicker" and fulling mill to make them denser. More recently, it was found that all synthetic needled felts could be further densified by rope washing them under a squeeze roll or by applying enough heat and pressure to permanently deform and harden the felt in a nip on a dryer.

In all the cases mentioned above, work is merely being performed on the felts and results in a closer packing of the fibers and yarns to produce a denser and harder felt.

Methods other than precompaction have also been used by feltmakers to increase the felt's resistance to compaction on the paper machine e.g. dense and multi-ply base fabrics, low batt/base ratios and chemical treatments. All of these have helped to some degree.

Although precompaction methods employed by the feltmakers to date have been somewhat effective in allowing faster startups on the paper machine, they have been limited in the degree of compaction. This is mainly due to the fact that during compaction, the felt density and hardness increases with a resulting decrease in void volume and permeability. In other words, the felt becomes filled up with itself. If this is carried too far, the felt will no longer function as a porous capillary structure and loses its water handling properties. It would be so hard and stiff, the papermaker probably would not be able to install it on his machine.

With the current trend toward higher press loadings and faster speeds on paper machines, the development of a compaction resistant press felt has become imperative. A new method of achieving this has been developed whereby a felt can be precompacted while controlling its void volume, by the method of the present invention. This new method incorporates the use of a relatively non-compressive base fabric and a web blend containing, in part, a solid fugitive material. After needling, the felt is subjected to heat and pressure, thereby increasing both its density and hardness to an appreciably higher degree than current precompaction methods allow. The fugitive material is then removed from the super compacted felt in order to regain the lost void volume, permeability and water handling properties.

The fabrics and method of the present invention obviate the expected prior art problems and permit the manufacture and use of wet-press felts having greater density and higher degrees of incompressibility, without significant reduction of void volumes or permeability.

By the method of the invention, the compressive modulus and elasticity of the felt can be permanently modified without loss of void volume or air permeability. The felts of the invention improve dewatering efficiency of the papermaking machine.

The prior art literature is replete with descriptions of prior art wet press felts, belts made therefrom and their use in papermaking machines. Representative of such description are those found in U.S. Pat. Nos. 2,883,734; 2,907,093; 3,097,413; 3,401,467; and 3,458,911.

SUMMARY OF THE INVENTION

The invention comprises a method of manufacturing a wet press papermaker's felt fabric, which comprises;

preparing a web of first textile fibers blended with a fugitive solid material which is removable from the web;

constructing a wet-press felt fabric and including said web as a layer in the felt fabric;

compacting the formed fabric to decrease the caliper and increase the overall density of the fabric; and removing the removable fugitive material;

whereby voids are formed in the fabric where the removable fugitive material was removed.

The invention also comprises the fabric manufactured by the method of the invention and its use in a wet press papermaker's felt. The fabric is supple but dense and will have both a higher compressive modulus (hardness) and at the same time a higher level of permeability and void volume while under papermachine press loads, than do press felts of the prior art.

In addition, the wet-press felts made from the compacted fabrics of the invention exhibit the following improved characteristics:

1. Compaction resistance via increased density and compressive modulus.
2. Supple hand—easy to install on the papermachine.
3. Increased permeability and void volume when under pressure.
4. Improved bilateral stability.
5. Improved surface smoothness and pressure distribution to the sheet of paper in the press.
6. Improved vacuum dewatering of the felt.
7. Cleaner running felt via elimination of large pores.
8. Improved pore size distribution.
9. Longer useful life and efficiency.

When installed on a papermaking machine, the felts of the invention result in:

Faster start-ups on the papermachine,

Increased dryness exiting the press,

Increased production rate and/or reduced energy costs and

Improved surface finish (smoother and less two sideness).

The fabric of the invention is also useful in the fabrication of

Corrugator belts,

Battery paster belts,

Pressure type filter fabrics, and

Fumebags.

DETAILED DESCRIPTION OF THE PREFERRED EMBODIMENTS OF THE INVENTION

Figure 1:
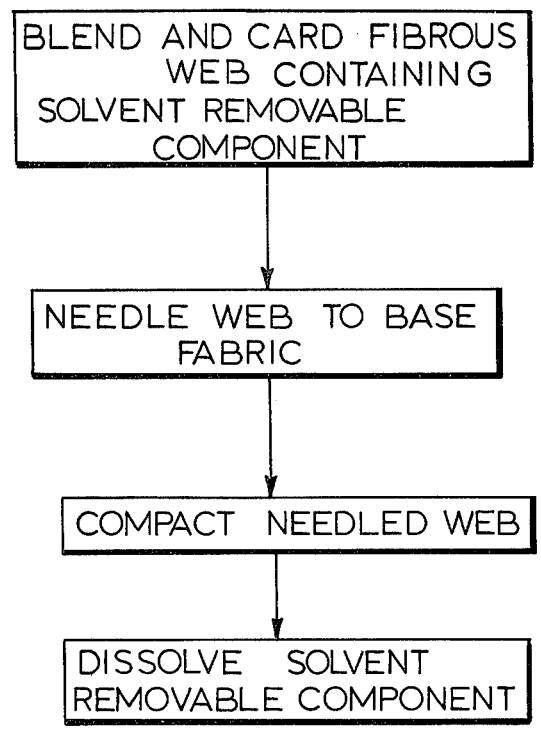
FIG. 1 is a block diagram showing the steps in the method of the invention for manufacturing a wet press felt fabric of the invention.

FIG. 1 is a block diagram setting forth the broad steps which comprise a preferred embodiment method of the invention. In the initial step, one provides a non-woven web of textile fibers made up by blending together staple textile first fibers of natural or synthetic polymeric resin compositions (such as staple fibers of polyamide, polyolefin, and the like synthetic polymeric resin fibers) with a solvent removable component. Solvent removable components are either synthetic polymeric resin staple or natural second fibers, which may be dissolved with specific solvents, to which the first fibers are solvent resistant. Representative of such solvent removable second fibers are fibers of wool, ethyl cellulose, polystyrene, polycarbonate and polystyrenemethylmethacrylate which are readily dissolved in dry cleaning solvents or aqueous acid or alkali mediums (see U.S. Pat. No. 3,311,928). Fibers of polyvinyl alcohol may be used and are removable by dissolution in water; as are fibers of poly (ethylene oxide). Fibers of certain polyethylenes are also usable, being removable by dissolution in hot water (see U.S. Pat. Nos. 2,714,758 and 3,317,864). Wool works best as the second fiber, is less expensive, and can be removed with 5% NaOH at 150° F. to 212° F. without damage to nylon as the first fiber.

Although the use of solvent removable fibers are preferred in the webs prepared or provided, other solvent removable materials may be used as the solvent removable component. Representative of such, less preferred materials are solid granules or particles of solvent removable, inert chemical components which may be dispersed homogeneously throughout webs of the first fibers described above. The term "inert" as used herein means that the chemical compound does not chemically react with the fibers or fabrics of the invention. Representative of such inert, solvent removable chemical compounds are dissolvable inorganic salts or the hydrates thereof or oxides thereof. The action of such a salt may generally be any of the alkaline metals and preferably any of the non-toxic alkaline earth metals, Column 1A and 2A, respectively, of the Periodic Table. Additionally, various other metals may be utilized such as iron, nickel, zinc, tin, silver and the like. The anion portion of the salt may generally be any negative charge entity, as the various carbonates, the various bicarbonates, the various nitrates, nitrates, or nitrides, the various sulfates, sulfites, or sulfides, the various phosphates, phosphites, or phosphides, including the ortho, pyro, hypo, variations thereof, and the like. Generally, the sulfates, sulfites and sulfides are preferred. Moreover, as noted above, the anion may be an oxide of the metal. Specific examples include magnesium carbonate, magnesium sulfide, magnesium phosphide, magnesium oxide, calcium carbonate, calcium bicarbonate, calcium nitride, calcium oxide, calcium phosphate, calcium phosphite, calcium sulfide, calcium sulfite, iron carbonate, iron sulfate, iron sulfide, iron sulfite, nickel carbonate, nickel sulfide, zinc carbonate, zinc oxide, zinc sulfide, zinc sulfite, tin sulfide, tin oxide, silver carbonate, silver oxide, silver sulfide, silver sulfite, sodium bicarbonate, lithium phosphate, beryllium oxide. Additionally, silicon dioxide may also be utilized. Magnesium carbonate, ammonium carbonate and barium carbonate are preferred, with calcium carbonate being highly preferred.

The inorganic salts may be added to the felt in two ways: (1) dry—by shaking or vibrating finely powdered salt into the pores of the felt, or (2) wet—by soaking the felt in a hot super-saturated salt solution, cooling to recrystalize the salt within the pores of the felt and drying in an oven.

The solvent removable components, whether a chemical compound in granular or particulate form or in the form of a textile fiber, is advantageously mixed and homogeneously dispersed with the first, solvent resistant textile fibers employed in making the fabrics of the invention. The proportion of solvent removable component dispersed in the solvent resistant fibers will depend on the volume of the solvent removable component and the desired void volume in the fabric of the invention. The optimum proportions may be determined by trial and error techniques. However, in general the proportions in the web blend will be within the ratio of from about 10 to about 100 parts by weight of solvent removable component for each 100 parts by weight of the solvent resistant, first fibers.

Following assembly of the fibrous and solvent removable components into a fibrous web form, the web may be needled to a base fabric to complete the assembly of the wet-press felt fabric. Techniques of needling are well known in the art and details need not be recited herein. Needling also compacts the needled fabric to some degree.

Following the assembly of the textile and the solvent removable components into the form of a wet-press felt fabric, the assembly is compacted under heat and pressure to obtain a fabric of greater density. Compacting may be carried out by passing the fabric through the nip of opposed calender rollers, having an opening less than the thickness of the needled fabric. The degree of compaction is optional. In general, compaction is carried out to obtain a wet-press felt fabric having a density of from about 35% to about 70% to that of the first fiber. The temperature employed during compaction may vary over a wide range. Generally a temperature of between 200° F. to 400° F. is advantageous, preferably circa 375° F. The pressures employed also may vary over a wide range, advantageously 50 to 1500 PSI. The use of higher pressures and/or temperatures than those mentioned above, result in only slight increases in densities and compression moduli with corresponding decreases in percent void volumes and permeabilities after the fugitive material is removed.

In a preferred embodiment of the invention, compaction of the fabric is not only under heat and pressure, but while the fabric is wet with water provided the fugitive material is not removable under the wet conditions. It was found that wet pressing was more effective than dry pressing in the permanent compaction properties of the felts, i.e., higher densities and compression moduli after removal of the removable, fugitive material.

In a final step of the method of the invention, the solvent fugitive or removable component is dissolved or leached out of the compacted fabric, leaving void spaces in the fabric. This may be done by washing the compacted fabric in the appropriate solvent, under appropriate conditions. The wet press felt fabric may then be dried and made into a belt for use on a papermaking machine.

Figure 2:
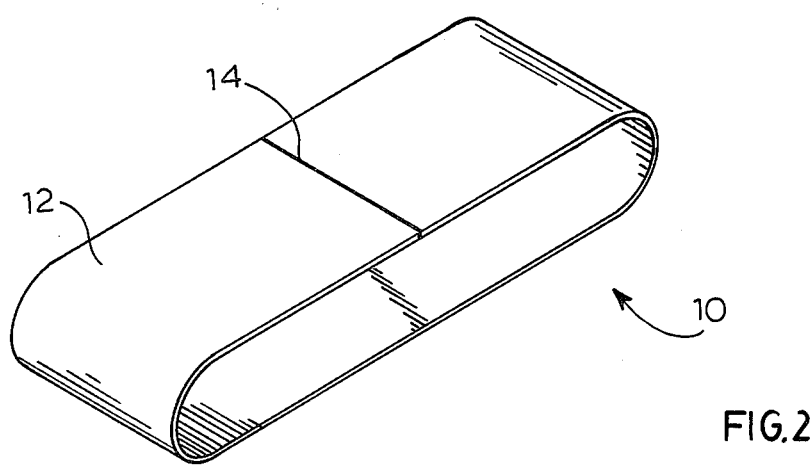
FIG. 2 is a view-in-perspective of an embodiment endless felt belt of the invention.

FIG. 2 is a view-in-perspective of an embodiment wet press belt 10 made by making endless a fabric 12 made by the method of the invention. The fabric 12 is made endless by joining the ends of the fabric 12 at seam 14, using conventional seaming techniques. Base fabric can be woven endless or joined to make felt endless.

Figure 3:
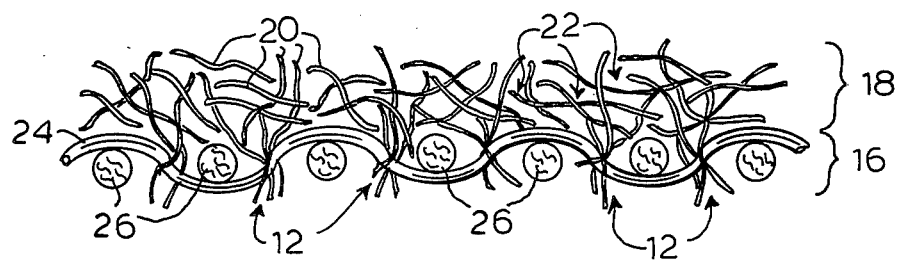
FIG. 3 is an enlarged, cross-sectional side elevation of a portion of the fabric used in the fabrication of the belt of FIG. 2.

FIG. 3 is a cross-sectional, side elevation of a portion of the embodiment fabric 10 of the invention and shows the multi-layer construction thereof including layers 16, 18. The layer 16 comprises a base fabric made by the interweaving of a plurality of machine direction yarns 24 with a plurality of cross-machine direction yarns 26. A simple weave is shown but any conventional weave pattern, single or multi-layered, may be used although a relatively open weave is preferred. The yarns 24, 26 may be any conventional fabric yarns such as spun, multifilament or monofilament yarns of natural, synthetic or mixed natural/synthetic textile material. Preferred are spun or multifilament yarns of synthetic textile fibers such as fibers of polyamides, polyesters, polyurethanes, polyaramids and the like. Monofilament represented by the same synthetic polymeric resins may also be used advantageously. The yarns 24, 26 preferably have a denier per filament within the range of from about 2 to about 2100.

Layer 18 is a web of non-woven, staple fibers 20 such as the first staple fibers described above. The layers 16 and 18 of the fabric 10 are joined to each other by needling so that the staple fibers 20 are integrated throughout both layers 16, 18. Ends 12 of the fibers 20 penetrate through the fabric of layer 16. Void spaces 22 are defined by and separate from the fibers 20.

The fabric 10 is particularly useful in the fabrication of wet press felts for use in the press section of a papermakers machine.

Figure 4:
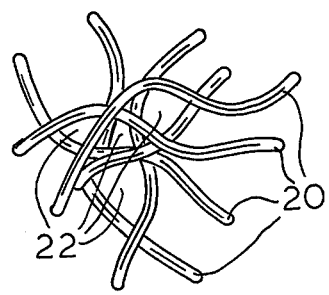
FIG. 4 is an enlarged view of the surface fibers shown in FIG. 3.

FIG. 4 is an enlarged view of the layer 18 in the fabric 10 shown in FIG. 3 and shows that the fibers 20 are separated by each other by the void spaces 22, which are in open fluid communication with each other for permeability.

As described above, the fabric 12 is made by assembling together the fabric components together with solvent removable components such as water-soluble fibers.

Figure 5:
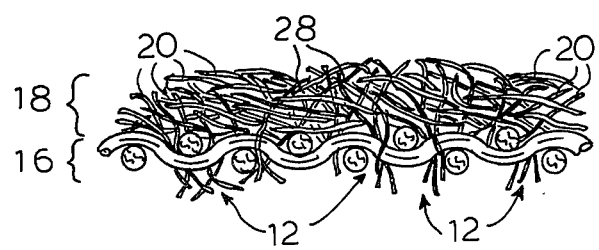
FIG. 5 is a view as in FIG. 3, but of the fabric after compaction under heat and pressure.
Figure 6:
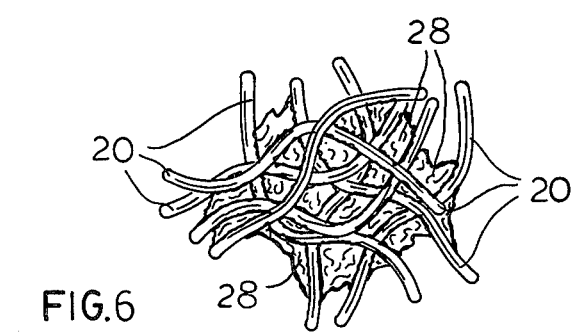
FIG. 6 is an enlarged view of the surface fibers shown in FIG. 5.

FIG. 5 is a view as in FIG. 3, but of the fabric 12 under heat and pressure but before removal of the solvent removable component fibers 28. The fibers 28 may be, for example, water soluble fibers of polyvinyl alcohol. The fibers 28 are homogeneously mixed with the solvent resistant fibers 20 and occupy the sites of the future void spaces 22. As shown in the FIG. 6, a greatly enlarged view of a portion of the layer 18 in FIG. 5, the fibers 28 may be fused together and lack individual fiber identity after compaction under heat and pressure. Upon dissolution of the fibers 28 or their residue, the space occupied by the fibers 28 or their residue becomes the void spaces 22 described in FIG. 3.

The following examples describe the manner and the process of making and using the invention and set forth the best mode contemplated by the inventor for carrying out the invention but are not to be construed as limiting. Where indicated, test results were obtained by the following test methods.
1. Dry weight, grams converted to oz/ft$^2$.
2. Size, area in square inches.
3. Thickness in inches at 30 oz/in$^2$ pressure.
4. Standard air permeability, cubic feet/minute per square foot at ½" H$_2$O Δ P.
5. Felt density, pounds of fiber per cubic foot of felt.
6. Z flow resistance while under a load of 166.5 psi. Although the ΔP was measured and recorded over the full range of flow (300 to 11,390 cc/min) only the ΔP at a flow setting of 1340 cc/min was tabulated.
7. Compression Test—thickness in inches vs. psi pressure from 0 to 700 psi on the Instron. Compression hysteresis, one cycle only from 0 to 700 psi. The modulus was calculated according to the following formula:

Compression Modulus between 50 and 500 psi = stress/strain =

$$\frac{500 \text{ psi} - 50 \text{ psi}}{\frac{\text{Thickness (inches) at 50 psi} - \text{Thickness (inches) at 500 psi}}{\text{Thickness (inches) at 50 psi}}} =$$

$$\text{Compression Modulus} \frac{450 \text{ psi}}{\text{fractional decrease in thickness between 50 and 500 psi}}$$

$$\text{"K" factor} = \frac{\text{resistance to compression}}{\text{resistance to Z flow}} \quad 8.$$

was calculated according to the formula:

$$K = \frac{\text{resistance to compression}}{\text{resistance to Z flow}} = \frac{C_R}{ZF_R} =$$

$$\frac{\text{compression modulus}}{\Delta P_Z} \times 10^{-2}$$

The "K" factor relates the compression modulus of a felt to its Z permeability in the compressed state, and is related to felt density and % void volume under a given pressure. Ideally, the "K" factor should be measured at the actual operating pressure for a particular press position in the field, where the compression modulus ($C_R$) and resistance to Z flow ($ZF_R$) are both measured at the same psi pressure.

EXAMPLE 1

A batt-on-mesh single layer base fabric is woven endless of monofilament (0.016" diameter) nylon cross-machine direction yarns and a 6 ply (0.008" single nylon) machine direction yarn using a broken twill weave pattern. The base fabric is subjected to heat setting and installed on a needle loom. To this base fabric, layers of non-woven belting composed of 25 parts by weight of Slipe 42's wool fibers and 75 parts by weight of 40 denier, 3" staple Nylon 6,6 fibers are applied to both sides of the base fabric using conventional needling techniques. The resulting fabric is compacted under heat and pressure by passing it through calender rollers, until it has a density of about 45 lbs/cu. ft. The resulting compacted fabric is then washed in 5% NaOH at 180° F. for a period sufficient to leach out the wool fiber. The resulting felt is water rinsed then processed in normal manner (dried and final sized for fit on a particular press position). The felt has a weight of 4 oz/sq. ft., a density of 38 lbs/ft$^3$ a thickness of 0.079 inches, an air permeability of 9.4 and a 50 to 500 psi compressive modulus of 6500 PSI. The felt so prepared has a number of advantages over prior art wet-press felts. For example they may be made endless and used on a papermachine without a break-in period. An added benefit which will be particularly appreciated by papermakers is that these felts are supple. Instead of being stiff like a piece of plywood, they are flexible like a piece of leather and will be easy to rope up when they are installed. An additional benefit is that these felts will not blow. This is because the volume change from outside the nip to within the nip will be greatly reduced so that less air will be "pumped" out of the felt as it enters the nip.

EXAMPLE 2

(A) A batt-on-mesh single layer base fabric is woven endless of monofilament (0.016" diameter) nylon cross-machine direction yarns and a 6 ply (0.008" single nylon) machine direction yarn using a broken twill weave pattern. The base fabric is subjected to heat setting and installed on a needle loom. To this base fabric, layers of non-woven belting composed of 25 parts by weight of Slipe 42's wool fibers and 75 parts by weight of 25 denier, 3" staple Nylon 6,6 fibers are needled to each side using conventional technique. A representative sample of the resulting fabric was tested to determine its physical properties. The tests performed and the observations made are shown in the following table under the heading "control".

(B) A portion of the fabric made or described above was compacted under a temperature of 375° F., and a pressure of 200 PSI while dry. The compacted fabric was then washed in a 5 percent solution of sodium hydroxide at a temperature 180° F. to remove the wool fibers. Representative samples of the compacted and washed fabric were also subjected to testing to determine physical properties. The observations made are given in the Table below under the heading "Pressed Dry".

Another portion of the fabric of step (A) above was treated as described in (B) above except that the fabric was wetted with water during its compaction. The test results obtained are given in the Table below, under the heading "Pressed Wet".

TABLE

|  | Control | Pressed Dry | Pressed Wet |
|---|---|---|---|
| Weight Before Pressing in oz/ft$^2$ | 4.46 | 4.35 | 4.41 |
| After Pressing |  | 4.35 | 4.37 |
| After Washing |  | 3.81 | 3.87 |
| % Weight Loss Due to Wash |  | 12.3 | 11.5 |
| Thickness Before Pressing in inches @ 30 oz/in$^2$ | .180 | .185 | .176 |
| After Pressing |  | .075 | .066 |
| After Washing |  | .086 | .074 |
| % Thickness Increase Due to Wash |  | 14.7 | 12.1 |
| Air Perm Before Pressing | 33.5 | 33.3 | 34.5 |
| (Std.) After Pressing |  | 4.4 | 3.9 |
| After Washing |  | 16.5 | 14.9 |
| Density Before Pressing | 18.6 | 17.6 | 18.8 |
| lbs/ft$^3$ After Pressing |  | 43.5 | 49.7 |
| After Washing |  | 33.8 | 39.2 |
| % Void Volume Before Pressing | 74.9% | 75.7% | 74.6% |
| After Pressing |  | 40.0% | 32.8% |
| After Washing | - | 52.6% | 45.0% |
| Z Flow Before Pressing ΔP, "H$_2$O @ 1340 cc/min | 6.8 |  |  |
| After Pressing |  |  |  |
| After Washing |  | 52.6% | 45.0% |
| Modulus Before Pressing | 1530 |  |  |
| After Pressing |  |  |  |

TABLE-continued

|  | Control | Pressed Dry | Pressed Wet |
| --- | --- | --- | --- |
| After Washing |  | 3420 | 3944 |
| "K" Factor | 2.3 | 8.8 | 13.6 |
| Pore Size in Microns |  |  |  |
| Average | 72 |  | 49 |
| Peak Density | 92 |  | 31 |

Tensile tests show that the pressed and NaOH washed samples stretch slightly less in both directions that the control samples. The bilateral stability was also more even in both directions than most of known standard press felt styles. The pressed and NaOH washed felt samples have a surprisingly supple hand while at the same time having a high density. The surface smoothness of the samples is increased by pressing and remains after the wool removal.

Samples were tested for equivalent pore size distribution and average equivalent pore size on an automated mercury intrusion porosimeter. The results show that compaction and wool removal reduces the larger pores so that the peak density of pores is smaller than the average. The uncompacted control shows a peak density of pore sizes larger than the average.

When the fabric of Example 2 was made up into an endless belt for use on a papermaking machine, the resulting super compacted/controlled void volume felts displayed high density, higher compaction resistance, less flow resistance under pressure, than standard production felts and control samples. They are stable but supple and have a smooth surface.

Those skilled in the art will appreciate that many variations of the above-described preferred embodiments may be made without departing from the spirit and scope of the invention. For example, the felts of the invention may be treated by heat-setting, with chemicals, etc., as conventionally done in the art to acheive particular properties. Also, those skilled in the art will appreciate that although the invention has been described herein in terms of a single type of wet felt press felt fabric, it applies to any textile felt construction, for example those described in U.S. Pat. Nos. 3,613,258 and 4,187,618.

The fabrics of the invention are unique and distinguishable from prior art wet-press felt fabrics. In general, the wet press felt fabrics of the invention are distinguishable from prior art fabrics in the following properties.

1. The Compressive Modulus is higher than found in prior art felts. Using nylon as first fiber and measured wet at loads between:
50 and 500 psi, the Modulus range is 3000 to 6000 PSI.
100 and 1000 psi, the Modulus range is 5000 to 9000 PSI.

2. The Density is higher than in prior art felts. The density of the finished felt of the invention would be 35% to 70% of the first fiber density, e.g. when using nylon as first fibers the density would be 25 to 50 pounds per cubic foot.

3. The Residual First cycle percent compression is lower than prior art felts.

This is needed for compaction resistance and maintaining higher void volume and permeability under nip pressures. With nylon as the first fiber and measured wet between 100 and 1000 psi, the range is 10 to 20% for the fabric of the invention.

4. Z Flow Resistance while under mechanical loading is lower than prior art felts.

When measured under a mechanical load of 1000 psi, 70° F., and at a water flow rate of 1340 cubic centimeters per minute the pressure drop, $\Delta P$ across the fabric ranges from 5 to 15 inches of water. At lower mechanical loadings, the $\Delta P$ range decreases in values.

5. % Void Volume (important, especially while under mechanical loading where it is higher than prior art felts). An unloaded range 40 to 70%. The decrease of this void volume when under pressure will be lower than in the case of prior art felts.

6. The thickness or caliper (not important by itself, can be controlled and varied independently), could be in the same range as prior art felts. However, one may be able to expand the range somewhat in both directions due to the method and other enhanced properties. A range of 0.050 to 0.500 inches at 30 oz./ft$^2$ is practical. A reduction in thickness of 40 to 65% upon compression of the as needled improved felt is required to acheive the desired levels of compressive modulus and density in the finished felt.

What is claimed:

1. An intermediate wet-press felt fabric, which comprises:
   a first layer of interwoven machine direction and cross-machine direction yarns; and
   a second layer of non-woven staple fibers, needled to the first layer;
   said staple fibers including a proportion of solvent removable fibers and a proportion of solvent resistant fibers.

2. A method of manufacturing a wet press papermakers felt fabric, which comprises:
   providing textile components of a wet press fabric;
   providing a solvent removable material, which is compatible with the textile components in a fabric structure, and which is a granular or particulate form of a chemical compound;
   assembling the textile components and the solvent removable material into the form of a wet press fabric wherein the solvent removable material is mixed and homogeneously disbursed in the textile components;
   compacting the formed fabric to increase the overall density of the fabric; and
   dissolving the solvent removable material;
   whereby voids are formed in the fabric where the solvent removable material is dissolved.

* * * * *